Patented Mar. 25, 1924.

1,488,355

UNITED STATES PATENT OFFICE.

LEON LILIENFELD, OF VIENNA, AUSTRIA.

PRODUCTION OF ETHERS OF CARBOHYDRATES HAVING THE EMPIRICAL FORMULA $n(C_6H_{10}O_5)$, THEIR CONVERSION PRODUCTS AND DERIVATIVES.

No Drawing.  Application filed April 25, 1921. Serial No. 464,356.

*To all whom it may concern:*

Be it known that I, LEON LILIENFELD, of Podhajce, Poland, a citizen of Poland, residing at 1 Zeltgasse, Vienna VIII, Austria, have invented certain new and useful Improvements in and Relating to the Production of Ethers of Carbohydrates Having the Empirical Formula $n(C_6H_{10}O_5)$, Their Conversion Products and Derivatives, of which the following is a specification.

The production of ethers of carbohydrates having the empirical formula $n(C_6H_{10}O_5)$ such as cellulose, starch, dextrine and the like, and their conversion products, (and the term "carbohydrate" is hereinafter employed in a broad sense to also include the conversion products insoluble in alkali) has heretofore been effected in so far as alkali cellulose was taken as starting material in the known manner by treating the carbohydrate or the carbohydrate-containing material first with caustic alkali solution and then by subjecting the carbohydrate so treated to a further treatment with alkylating, aralkylating or arylating agents converting the same into ethers.

I have now found that carbohydrate ethers produced by this process and having the fullest technical utility and particularly having the highest water resisting character can be obtained if the carbohydrates or their conversion products or derivatives are treated in the presence of at least 15 parts of a 30 to 50% solution of alkali to one part of carbohydrate in known manner with alkylating, aralkylating or arylating agents. The mode of treatment with said alkylating, aralkylating or arylating agents will be clear from a study of Example 11 of a prior U. S. patent issued to me June 20, 1916, No. 1,188,376. As in said prior patent the etherifying agents may be the dialkyl sulfates, alkyl halides, or the corresponding aralkyl halides, aryl halides, etc.

The carbohydrate ethers produced in this way and the technical products formed therefrom particularly as regards their resistance to water, satisfy the highest technical requirements.

What I claim and desire to secure by Letters Patent is:

1. A process of producing ethers of carbohydrates of the empirical formula $n(C_6H_{10}O_5)$ which consists in treating carbohydrates with at least 15 parts of a 30–50% caustic alkali solution to each one part of carbohydrates and then treating the same in the known manner with alkylating agents, substantially as described.

2. A process of producing ethers of carbohydrates of the empirical formula $n(C_6H_{10}O_5)$ which consists in treating carbohydrates with at least 15 parts of a 30–50% caustic alkali solution to each one part of carbohydrates and then treating the same in the known manner with etherifying agents, substantially as described.

3. A process of producing ethers of cellulosic bodies which comprises adding at least 15 parts of a 30 to 50% caustic alkali solution to each one part of cellulose, and then treating the mixture with an etherifying agent.

In testimony whereof I have signed my name to this specification.

Dr. LEON LILIENFELD.